United States Patent Office 3,400,106
Patented Sept. 3, 1968

3,400,106
BASIC ZINC DOUBLE SALTS OF O,O-DIALKYL PHOSPHORODITHIOIC ACIDS AS VULCANIZATION ACCELERATORS FOR RUBBER
Eiichi Morita, St. Albans, W. Va., assignor to Monsanto Company, St. Louis, Mo., a corporation of Delaware
No Drawing. Filed Sept. 28, 1966, Ser. No. 582,520
14 Claims. (Cl. 260—79.5)

This invention relates to improved methods for accelerating the vulcanization of rubber and to the vulcanized rubber products obtained using the methods. More particularly, the invention relates to improved methods for accelerating the vulcanization of EPDM rubber. The invention relates to the use of basic zinc double salts of O,O-dialkyl phosphorodithioic acids, as vulcanization accelerators in rubber alone or in combination with thiazole and thiuram accelerators. The invention also relates to improved methods for preparing the basic zinc double salts of O,O-dialkyl phosphorodithioic acids.

The invention is particularly useful in EPDM rubber. The American Society for Testing and Materials (ASTM) defines EPDM in the 1965 Book of ASTM Standards, Part 28, page 695 as follows: "EPDM—Terpolymer containing ethylene and propylene in the backbone and a diene in the side chain." Amberg discusses the dienes which have been used with ethylene and propylene in Vulcanization of Elastomers, 324, 325 (Alliger and Sjothum, ed., 1963). Amberg states: "Good results have been obtained with compounds which have one internal and one terminal double bond. Dicyclopentadiene is one of the preferred dienes. 2-methylene-norbornene and 11-ethyl-1,11-tridecadiene are examples of other monomers which react satisfactorily." Cyclooctadiene and 1,4-hexadiene are also used as the diene monomer of EPDM. The invention is also useful in natural and synthetic rubbers other than EPDM.

An object of this invention is to promote the progress of science and useful arts. An object of the invention is to provide improved vulcanized rubber compositions. An object of the invention is to provide a fast vulcanization accelerator system for EPDM. A further object of hte invention is to provide improvements for the preparation of basic zinc double salts of O,O-dialkyl phosphorodithioic acids. Other objects will become apparent as the description of the invention proceeds.

A number of curing systems for EPDM utilizing as accelerators combinations of thiuram mono, or polysulfides or metal salts of a dithiocarbamic acid and a thiazole accelerator are reported. However, bloom generally appears on the surface of the EPDM when a high concentration of one of these sulfides or metal salts is used in the combination. Thiurams and thiazoles are known vulcanization accelerators. Romieux in U.S. Patent 1,867,631 assigned to American Cyanamid Company (1932) reports the accelerator properties of di-substituted phosphorodithioates for the vulcanization of rubber. This work is followed by Anderson's in U.S. Patent 2,879,243 assigned to U.S. Rubber Company (1959) which reports thiazole accelerators activated by alkali dialkyl phosphorodithioates as accelerator combinations for the vulcanization of rubber articles formed from latex. My copending application, Ser. No. 407,905 filed Oct. 30, 1964, of which I am a co-inventor with Aubert Y. Coran, relates to accelerator combinations containing a normal salt of a zinc O,O-dialkyl phosphorodithioate. The basic zinc double salts of O,O-dialkyl phosphorodithioic acids useful in this invention are reported in U.S. Patent 2,794,780 of Wystrach assigned to American Cyanamid Company (1957); Wystrach, 21 J. Org. Chem. 705 (1956); and Bacon, 27 J. Org. Chem. 1484 (1962). Wystrach's work reports that the new and unusal type of basic zinc salt is isolated as a by-product from the preparation of zinc O,O-di-n-butyl phosphorodithioate.

As fast vulcanization accelerator is highly desirable for EPDM rubber. I have found that a combination of a basic zinc double salt of an O,O-dialkyl phosphorodithioic acid and either or both a thiazole accelerator or a thiuram mono, or polysulfide provides a fast vulcanization accelerator system and an improved product when used to accelerate the vulcanization of EPDM. By combining a basic zinc double salt of an O,O-dialkyl phosphorodithioic acid and either or both a thiazole accelerator or a thiuram mono or polysulfide, I have found that the effectiveness of each accelerator is enhanced when used to accelerate the vulcanization of EPDM. In addition, the bloom on the surface of the EPDM is eliminated.

The basic zinc double salts of O,O-dialkyl phosphorodithioic acids useful in this invention have the general structural formula:

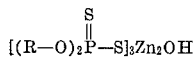

where R is a primary or secondary alkyl radical containing less than 19 carbon atoms. Examples of R are methyl, ethyl, propyl, isopropyl, butyl, isobutyl, 4-methyl-2-pentyl, hexyl, octyl, decyl, dodecyl, tridecyl, tetradecyl, octadecyl, hexadecyl, 1,3-dimethylbutyl, and 2-ethyl hexyl.

The thiazol accelerators of this invention contain the 2-mercapto thiazolyl radical

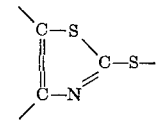

Some examples of thiazole accelerators useful in this invention are as follows:
2-mercaptobenzothiazole
Sodium 2-mercaptobenzothiazole
Zinc 2-mercaptobenzothiazole
2,2'-dithiobis benzothiazole
2-(morpholinothio)-benzothiazole
2-benzothiazolyl-1-hexamethylenimine carbodithioate
2-benzothiazolyl-thiolbenzoate
1,3-bis(2-benzothiazolylmercaptomethyl)urea
2-(2,4-dinitrophenylthio)benzothiazole
S(2-benzothiazolyl)N,N-diethyl dithiocarbamate
N-cyclohexyl benzothiazole-2-sulfenamide
N-tert-butyl benzothiazole-2-sulfenamide The thiurams useful in this invention are compounds of the formula

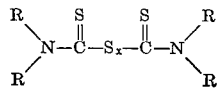

where the R's are alkyl or alicyclic radicals containing 1 to 9 carbon atoms. The R's on the same nitrogen can form a ring with the nitrogen atom, and the ring contains from 4 to 9 carbon atoms. In addition, the R's on the same nitrogen can form a ring with the nitrogen of morpholine or 2,6-dimethylmorpholine. The $x$ can be a number from 1 to 4. Some examples of the thiurams useful in this invention are as follows:

Tetramethylthiuram monosulfide
Tetramethylthiuram disulfide
Tetramethylthiuram trisulfide
Tetramethylthiuram tetrasulfide
Tetraethylthiuram monosulfide
Tetraethylthiuram disulfide
Tetraethylthiuram trisulfide
Tetraethylthiuram tetrasulfide The following tables and examples illustrate the invention in more detail, but are not to be construed as to narrow the scope of the invention. Evaluation of the EPDM accelarators is carried out in a base formulation comprising:

| | Parts by weight |
|---|---|
| EPDM | 100.0 |
| Zinc oxide | 5.0 |
| Carbon black | 80.0 |
| Aromatic processing oil | 40.0 |
| Sufur | 1.5 |

The EPDM used in this base formulation is known commercially as Nordel 1070.

The accelerators tested with the base formulation described are represented by letter as follows:

A:                                             Parts by weight
  Tetramethylthiuram monosulfide _____ 3.0
B:
  2,2'-dithiobisbenzothiazole _____ 3.0
C:
  Basic zinc double salt of O,O-di-n-butyl
    phosphorodithioic acid _____ 3.0
D:
  2,2'-dithiobisbenzothiazole _____ 2.0
  Basic zinc double salt represented by C, above ____ 1.0
E:
  2,2'-dithiobisbenzothiazole _____ 1.0
  Basic zinc double salt represented by C, above ___ 2.0
F:
  2,2'-dithiobisbenzothiazole _____ 1.5
  Basic zinc double salt represented by C, above ____ 1.5
G:
  Tetramethylthiuram monosulfide _____ 1.5
  Basic zinc double salt represented by C, above ____ 1.5
H:
  Tetramethylthiuram monosulfide _____ 1.0
  2,2'-dithiobisbenzothiazole _____ 1.0
  Basic zinc double salt represented by C, above ____ 1.0
J:
  Tetramethyl thiuram monosulfide _____ 0.5
  2,2'-dithiobisbenzothiazole _____ 1.0
  Basic zinc double salt represented by C, above ____ 1.5
K:
  Tetramethyl thiuram monosulfide _____ 0.5
  2,2'-dithiobisbenzothiazole _____ 1.5
  Basic zinc double salt represented by C, above ____ 1.0
L:
  Tetramethyl thiuram monosulfide _____ 1.0
  2,2'-dithiobisbenzothiazole _____ 0.5
  Basic zinc double salt represented by C, above ____ 1.5
M:
  Tetramethyl thiuram monosulfide _____ 1.5
  2,2'-dithiobisbenzothiazole _____ 0.5
  Basic zinc double salt represented by C, above ____ 1.0
N:
  Tetramethyl thiuram monosulfide _____ 1.0
  2,2'-dithiobisbenzothiazole _____ 1.5
  Basic zinc double salt represented by C, above ____ 0.5
O:
  Tetramethyl thiuram monosulfide _____ 1.5
  2,2'-dithiobisbenzothiazole _____ 1.0
  Basic zinc double salt represented by C, above ___ 0.5

The base formulation is evaluated with each sample of accelerator or accelerator combination listed by heating each stock to 135° C. in a Mooney plastometer. The time in minutes required for the viscosity of the stock to increase 5 units above the minimum viscosity is determined. These values are commonly known as "Mooney Scorch Time" ($t_5$). Additionally, the time required in minutes for the viscosity of the stock to rise from 5 units above the minimum to 35 units above the minimum at 135° C. is recorded in Table I as the Cure Rate Factor ($t_{35-5}$). The Mooney plastometer data for the stocks vulcanized at 135° C. are recorded in Table I. The base formulation was constant for each sample of accelerator.

TABLE I

| Accelerator | Mooney scorch time, mins. $t_5$ | Cure rate factor, mins. $t_{35-5}$ |
|---|---|---|
| A | 17.8 | 29.9 |
| B | 62.5 | |
| C | 13.6 | 19.4 |
| D | 14.6 | 22.1 |
| E | 8.7 | 12.3 |
| F | 10.1 | 15.0 |
| G | 15.6 | 20.3 |
| H | 9.8 | 13.3 |
| J | 8.2 | 11.5 |
| K | 8.8 | 12.8 |
| L | 10.3 | 14.0 |
| M | 12.5 | 17.0 |
| N | 10.0 | 13.8 |
| O | 11.2 | 15.3 |

Stress strain data from EPDM stock cures at 160° C. are recorded in Table II. The base formulation is constant for each sample of accelerator. The moduli at 300% elongation reported in the tables, infra, are obtained using the method of the American Society for Testing and Material (ASTM) designation, D412-64T. The method covers the determination of the effect of the application of a tension load to a vulcanized sample of rubber obtained using an accelerator combination of this invention. The modulus at 300% elongation is calculated as follows:

Modulus at 300% Elongation in lbs./in.$^2$
$$= \frac{\text{Force at 300\% Elongation}}{\text{Original Cross-Sectional Area of the Sample}}$$

The test is reported in deail in the 1966 Book of ASTM Standards Part 28, pages 197–208.

TABLE II

| Accelerator | Time at 160° C. cure (minutes) | Modulus at 300% elongation (lbs./in.$^2$) | Ultimate tensile strength (lbs./in.$^2$) | Ultimate elongation, percent |
|---|---|---|---|---|
| A | 20 | 1,320 | 2,750 | 560 |
|   | 40 | 1,230 | 2,515 | 560 |
| B | 20 | | 250 | 1,200+ |
|   | 40 | 355 | 1,750 | 875 |
| C | 20 | 575 | 2,380 | 715 |
|   | 40 | 835 | 2,760 | 680 |
| D | 20 | 1,190 | 2,860 | 555 |
|   | 40 | 1,495 | 2,780 | 480 |
| E | 20 | 1,390 | 2,980 | 540 |
|   | 40 | 1,640 | 2,915 | 480 |
| F | 20 | 1,370 | 2,690 | 475 |
|   | 40 | 1,600 | 2,730 | 465 |
| G | 20 | 1,220 | 2,960 | 605 |
|   | 40 | 1,335 | 2,930 | 555 |
| H | 20 | 1,590 | 2,840 | 470 |
|   | 40 | 1,760 | 2,930 | 465 |
| J | 20 | 1,615 | 3,020 | 500 |
|   | 40 | 1,675 | 2,940 | 470 |
| K | 20 | 1,565 | 2,740 | 465 |
|   | 40 | 1,700 | 2,770 | 445 |
| L | 20 | 1,590 | 3,015 | 505 |
|   | 40 | 1,605 | 2,870 | 475 |
| M | 20 | 1,715 | 2,945 | 470 |
|   | 40 | 1,730 | 3,025 | 470 |
| N | 20 | 1,710 | 3,100 | 485 |
|   | 40 | 1,815 | 3,050 | 460 |
| O | 20 | 1,415 | 2,830 | 450 |
|   | 40 | 1,860 | 2,865 | 420 |

The moduli of elasticity of stocks in Table II containing the basic zinc double salt combined with 2,2'-dithiobisbenzothiazole or tetramethylthiuram disulfide or both illustrate the enhanced effectiveness of the accelerator combination when compared with the moduli of elasticity of stocks containing only single components of the combinations. The combinations of the basic zinc double salt with 2,2'-dithiobis benzothiazole or tetramethyl thiuram monosulfide or both give greater tensile strength than the single components.

The data in Table III illustrate the Mooney Scorch Times and the Cure Rate Factors for styrene-butadiene rubber (SBR) vulcanized with accelerator combinations of this invention including the basic zinc double salt of O,O-di-n-propyl phosphorodithioic acid or the basic zinc double salt of O,O-di-n-butyl phosphorodithioic acid. Curing characteristics of the stocks in Table III at 160° C. are also determined by means of the Monsanto oscillating disc rheometer described by Decker, Wise, and Guerry in Rubber World, December 1962, page 68. From the rheometer data, $T_2$ is the time in minutes for a rise of two rheometer units above the minimum reading and $T_{90}$ is the time required to obtain a modulus 90% of the maximum. The stocks in Table III contain the following base formulation.

| | Parts by weight |
|---|---|
| Styrene butadiene rubber | 100.0 |
| Carbon black | 50.0 |
| Zinc oxide | 4.0 |
| Stearic acid | 2.0 |
| Hydrocarbon softener | 10.0 |
| Sulfur | 1.50 |

The accelerators tested with the base formulation are represented by letter as follows:

A: Parts by weight
  Tetramethylthiuram monosulfide _____ 0.50
  2,2'-dithiobisbenzothiazole _____ 1.50
B:
  Tetramethylthiuram monosulfide _____ 0.50
  2,2'-dithiobisbenzothiazole _____ 1.50
  Basic zinc double salt of O,O-di-n-butyl
    phosphorodithioic acid _____ 2.0
C:
  Tetramethylthiuram monosulfide _____ 0.5
  2,2'-dithiobisbenzothiazole _____ 1.50
  Basic zinc double salt of O,O-di-n-propyl
    phosphorodithioic acid _____ 2.0

TABLE III

| Accelerator | A | B | C |
|---|---|---|---|
| Mooney scorch time, mins. $t_5$ | 13.8 | 7.8 | 8.8 |
| Cure rate factor, mins. $t_{35-5}$ | 5.8 | 3.6 | 3.3 |
| $T_2$ | 5.3 | 3.2 | 3.6 |
| $T_{90}$ | 27.7 | 14.9 | 15.8 |
| Modulus at 300% elongation (lbs./in.²) at optimum cure time | 1,540 | 1,760 | 1,700 |

The optimum cure time for the stock containing Accelerator A is 60 minutes. The optimum cure time for Stocks B and C is 30 minutes.

The basic zinc double salts of O,O-dialkyl phosphorodithioic acids are also stabilizers against aging for raw polymer. The Mooney viscosity reported in Table IV is the torque required to turn a rotor embedded in the rubber sample after rotating 4 minutes. The Mooney viscosity test has the ASTM Designation, D1646–63. The data of Table IV illustrate the results of aging unstabilized raw polymer of EPDM with and without 1 part per hundred rubber of the basic zinc double salt of O,O-di-n-butyl phosphorodithioic acid at 200° C. for one hour. The higher numbers under "Color" indicate greater discoloration, which is undesirable. A dark brown color is rated 4. A light greenish yellow is rated 1. Ionol is a commercial stabilizer and is a trademark for 2,6-di-tert-butyl-4-methylphenol. Antioxidant 2246 is a commercial stabilizer and is a trademark for 2,2'-methylenebis(4-methyl-6-tertiarybutyl phenol).

TABLE IV

| Stock | Test compound | Mooney viscosity Unaged | Mooney viscosity Aged | Properties after aging Odor | Properties after aging Color |
|---|---|---|---|---|---|
| 1 | None | 76.0 | 62.5 | Bad | 3 |
| 2 | Basic zinc double salt of O,O-di-n-butyl phosphorodithioic acid | 79.0 | 79.5 | Least | 1 |
| 3 | Ionol | 73.0 | 59.5 | Very bad | 2 |
| 4 | Antioxidant 2246 | 74.0 | 74.0 | Slight | 4 |

The basic zinc double salt of O,O-di-n-butyl phosphorodithioic acid is the most outstanding stabilizer in Table IV for protecting EPDM from changes in Mooney viscosity, discoloration, and odor.

Results comparable to those in the tables, supra, are obtained when the accelerators of this invention are used in natural rubber and synthetic rubbers other than EPDM or SBR.

In butyl rubber stocks, the use of combinations of the basic zinc double salt of O,O-di-n-butyl phosphorodithioic acid and tetramethylthiuram monosulfide as vulcanization accelerators gives lower heat buildup, lower permanent set, and a higher modulus compared to butyl stocks containing tetramethylthiuram monosulfide alone. Butyl rubber is a synthetic rubber produced by copolymerization of at least 85% isobutene with a small proportion of not more than 15% of conjugated diene. According to Rose, The Condensed Chemical Dictionary (6th Ed. 1963), the conjugated diene is usually isoprene or butadiene.

The Goodrich hysteresis and Goodrich permanent set reported in Table VI, infra, are obtained using the method of the ASTM Designation, D623–62. These methods are for use in comparing the rate of heat generation and the fatigue characteristics of vulcanized samples of butyl rubber obtained using an accelerator combination of this invention. The Goodrich flexometer is used for these tests. In this device, a definite compressive load is applied to a test sample through a lever system having high inertia, while imposing on the specimen an additional high-frequency cyclic compression of definite amplitude. The increase in temperature at the base of the test sample is measured with a thermocouple to provide a relative indication of the heat generated in flexing the sample. The change in height of the sample measured after the test gives the permanent set. The tests are reported in detail in the 1966 Book of ASTM Standards, Part 28, pages 334–341.

The butyl rubber stocks in the tables, infra, are comprised of the following:

| | Parts by weight |
|---|---|
| Butyl 217 [1] | 100.0 |
| Intermediate super abrasion furnace carbon black | 40.0 |
| Zinc oxide | 5.0 |
| Stearic acid | 1.0 |
| Saturated oil hydrocarbon softener | 10.0 |
| Sulfur | 1.0 |
| Total | 157.0 |
| Tetramethylthiuram monosulfide | ([2]) |
| Basic zinc double salt of O,O-di-n-butyl phosphorodithioic acid | ([2]) |

[1] Enjay Butyl 217, a product of the Enjay Chemical Co., Synthetic Rubber Division.
[2] As indicated, infra.

There are 5 butyl rubber stocks in Tables V and VI. The stocks vary in accelerator concentration as follows:

| Stock | 1 | 2 | 3 | 4 | 5 |
|---|---|---|---|---|---|
| Tetramethylthiuram monosulfide (parts by weight) | 2.5 | 2.0 | 1.5 | 1.0 | 0.5 |
| Basic zinc double salt of O,O-di-n-butyl phosphorodithioic acid (parts by weight) | | 0.5 | 1.0 | 1.5 | 2.0 |

TABLE V

| Stock | Cure time at 153° C. (minutes) | Modulus at 300% elongation (lbs./in.²) | Ultimate tensile strength (lbs./in.²) | Ultimate elongation, percent |
|---|---|---|---|---|
| 1 | 50 | 820 | 2,450 | 600 |
|   | 60 | 890 | 2,350 | 590 |
| 2 | 50 | 890 | 2,500 | 590 |
|   | 60 | 980 | 2,500 | 580 |
| 3 | 50 | 900 | 2,500 | 590 |
|   | 60 | 980 | 2,540 | 570 |
| 4 | 50 | 830 | 2,540 | 620 |
|   | 60 | 900 | 2,550 | 590 |
| 5 | 60 | 750 | 2,570 | 670 |
|   | 70 | 830 | 2,830 | 660 |

The stocks of Table VI were cured at 153° C. for either 60 or 80 minutes before the test. The $\Delta T$'s for the cured samples are measured from a starting temperature of 50° C.

TABLE VI

Goodrich hysteresis

| Minutes cure at 153° C. | Stock | | | | |
|---|---|---|---|---|---|
| | 1 | 2 | 3 | 4 | 5 |
| | ΔT.°C. | ΔT.°C. | ΔT.°C. | ΔT.°C. | ΔT.°C. |
| 60 | 46 | 39 | 40 | 38 | 65 |
| 80 | 44 | 40 | 36 | 39 | 73 |

Goodrich permanent set

| Minutes cure at 153° C. | Stock | | | | |
|---|---|---|---|---|---|
| | 1 | 2 | 3 | 4 | 5 |
| | Percent change from stocks' original height | | | | |
| 60 | 14.8 | 9.9 | 8.9 | 9.9 | 16.2 |
| 80 | 11.4 | 9.2 | 6.6 | 8.1 | 7.3 |

Results comparable to those in Tables V and VI, supra, are obtained when the accelerator combinations of this invention are used in natural rubber and synthetic rubbers other than butyl rubber.

Carbon black is used as a filler in rubber stocks. Results comparable to those in Tables I–VI, supra, are obtained in rubbers wherein fillers other than carbon black are used, for examples, EPDM or butyl rubber using a mineral filler of clay.

I have found that the yield of basic zinc double salts of O,O-dialkyl phosphorodithioic acids is increased in the reaction of zinc oxide and O,O-dibutyl phosphorodithioic acid in benzene solution by the addition of the corresponding normal salt of the zinc O,O-dialkyl phosphorodithioate to the reaction mixture. I have also found that the yield of basic zinc double salts of O,O-dialkyl phosphorodithioic acids is increased in the reaction of zinc oxide and O,O-dialkyl phosphorodithioic acid by carrying out the reaction in a mixture of alcohol and water. Examples of useful alcohols are methanol, ethanol, and isopropanol. The following examples illustrate these improvements in more detail.

Example 1

$$2ZnO + 3(nC_4H_9O)_2\overset{S}{\underset{\|}{P}}SH \longrightarrow [(nC_4H_9O)_2\overset{S}{\underset{\|}{P}}S]_3Zn_2OH + H_2O$$

To a slurry of 17 grams, 0.21 mole, zinc oxide in 25 ml. of methanol and 25 ml. of water, 72.8 grams, 0.30 mole O,O-di-n-butyl phosphorodithioic acid is added in 3 minutes at room temperature with slight stirring and slight external cooling. The temperature rises from about 25° C. to about 50° C. Heat is applied and the temperature of the slurry is maintained at about 50°–54° C. for a total reaction time of 70 minutes. The milky slurry changes to a heavy paste, then a less viscous liquid. The slurry at the end of the reaction time contains granular milky solids. After cooling to room temperature, the reaction product is filtered and washed with methanol. The product is dried in a 50° C. vacuum oven overnight. The product weighs 72.5 grams, an 83% of theory yield. The melting point is 143°–145° C. Analysis shows 22.03% sulfur, 10.11% phosphorus and 16.38% zinc. Calculated percentages for $C_{24}H_{55}O_7S_6P_3Zn_2$ are 22.07% sulfur, 10.66% phosphorus and 15.00% zinc. The yields of the basic zinc double salts of O,O-dialkyl phosphorodithioic acids are increased by carrying out the reactions in mixtures of alcohol and water wherein the alcohol concentrations are within the range of 10–95%. The preferred alcohol concentrations of the solvent mixtures are 50–95%.

Example 2

A mixture of 300 ml. benzene, 548 grams zinc O,O-dibutyl phosphorodithioate and 243 grams O,O-dibutyl phosphorodithioic acid is stirred at a temperature of 25°– 46° C. while 120 grams ZnO is added over a 20 minute period. The mixture is then heated to 64° C. for 35 minutes. The mixture is heated for 1.5 hours to a temperature of 93° C. Eight ml. of water is azeotroped from the mixture. The mixture is then cooled, diluted with benzene and filtered. The residue is washed with benzene. The benzene in the filtrate is removed on a rotary evaporator under vacuum and heat. The total product is 740 grams. The basic zinc double salt of O,O-dibutyl phosphorodithioic acid is isolated by washing the product with methanol and filtering. The liquid normal salt of zinc O,O-dibutyl phosphorodithioate is readily soluble in methanol and the solid basic zinc double salt is not readily soluble in cold methanol. The reaction yields 465 grams basic zinc double salt of O,O-dibutyl phosphorodithioic acid.

The preparations in Table VII follow the same procedure as Example 2. The data in the table illustrate the improved yield of the basic zinc double salt of O,O-dibutyl phosphorodithioic acid when the liquid normal salt of zinc O,O-dibutyl phosphorodithioate is added to the reaction.

TABLE VII

| Preparation | 1 | 2 | 3 | 4 |
|---|---|---|---|---|
| Normal salt of zinc O,O-di-n-butyl phosphorodithioate, g | | 109.6 | | 109.6 |
| O,O-di-n-butyl phosphorodithioic acid, g | 97.0 | 97.0 | 97.0 | 97.0 |
| Benzene, ml | 75.0 | 100.0 | 120.0 | 100.0 |
| ZnO, g | 32.5 | 32.5 | 32.5 | 32.5 |
| Reaction time, min | 90 | 90 | 135 | 130 |
| Temperature ° C | 23–93 | 25–93 | 24–85 | 24–96 |
| Water, g | | | 6.5 | 7.0 |
| Product: | | | | |
| Water (azeotroped), ml | 3.1 | 3.0 | 11.0 | 10.0 |
| Solid fraction, g | 30.0 | 72.0 | 67.0 | 106.0 |
| Liquid fraction, g | 68.0 | 138.0 | 37.0 | 96.0 |

Comparable results to those in Examples 1 and 2 are obtained in preparing the other basic zinc double salts of O,O-dialkyl phosphorodithioic acids of this invention.

It is preferred that the thiuram, thiazole, or combination of thiuram and thiazole constitute 20%–80% by weight of the combination with the basic zinc double salts of O,O-dialkyl phosphorodithioic acids and the latter 80%–20%. In general, the basic zinc double salts of this invention stabilize any of the synthetic diene rubbers whether of low or high functionality. These rubbers include styrene-butadiene copolymer rubber, butyl rubber, EPDM, cis polyisoprene and cis polybutadiene. Stabilizing amounts fall within the range of 0.1–10%. The synthetic rubbers lack the natural stabilizers of natural rubber and the raw polymers must be protected from cross linking chain scission, oxidation and discoloration. The factors causing degradation and the manifestation thereof are complex. Acceleration effect is noted in any of the diene rubbers whether natural or synthetic but the basic zinc double salts are particularly advantageous in synthetic diene rubber of low functionality i.e., those diene rubbers in which the diene content is not more than about 15%. Amounts in the range of 0.25–5% constitute a commonly used useful range for either stabilization or acceleration. A preferred range is 0.5–1.5%. It will be appreciated that by basic zinc double salts are meant compositions which are substantially free of the normal salts i.e., not more than about 10% of the normal salt is present and usually only traces thereof. The solid compounds useful in this invention are about 90% basic zinc double salts of O,O-dialkyl phosphorodithioic acids. Small amounts of zinc oxide and the normal salts can be present in the solid compounds useful in this invention.

It is intended to cover all changes and modifications of the examples of the invention herein chosen for purposes of disclosure which do not constitute departures from the spirit and scope of the invention.

I claim:
1. A method of vulcanizing a sulfur-vulcanizable rubber which comprises:

mixing the rubber with a sulfur-containing vulcanizing agent and an accelerating amount of a solid consisting essentially of a basic zinc double salt of O,O-dialkyl phosphorodithioic acid of the formula

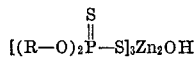

where R is a primary or secondary alkyl radical containing less than 19 carbon atoms; and heating the mixture at a vulcanizing temperature.

2. A method of vulcanizing a sulfur-vulcanizable rubber according to claim 1 wherein the basic zinc double salt is the basic zinc double salt of O,O-di-n-butyl phosphorodithioic acid.

3. A composition comprising a sulfur vulcanizable synthetic diene rubber containing 0.1–1.0% by weight of the rubber of the basic zinc double salt of claim 1.

4. The composition of claim 3 wherein the amount of basic zinc double salt is 0.5–1.5% and the rubber is EPDM.

5. A method of vulcanizing a sulfur-vulcanizable rubber which comprises:

mixing the rubber with a sulfur-containing vulcanizing agent and an accelerating amount of a vulcanization accelerator combination of a solid consisting essentially of a basic zinc double salt of O,O-dialkyl phosphorodithioic acid of the formula

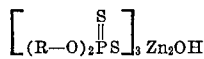

where R is a primary or secondary alkyl radical containing less than 19 carbon atoms and a thiazole containing the radical

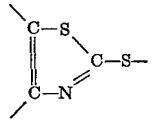

and heating the mixture at a vulcanizing temperature.

6. A method of vulcanizing a sulfur-vulcanizable rubber according to claim 5 wherein the basic zinc double salt is the basic zinc double salt of O,O-di-n-butyl phosphorodithioic acid and the thiazole is 2,2′-dithiobis(benzothiazole).

7. A method of vulcanizing a sulfur-vulcanizable rubber according to claim 5 wherein the rubber is EPDM.

8. A method of vulcanizing a sulfur-vulcanizable rubber according to claim 6 wherein the rubber is EPDM.

9. A method of vulcanizing a sulfur-vulcanizable rubber which comprises:

mixing the rubber with a sulfur containing vulcanizing agent and an accelerating amount of a vulcanization accelerator combination of a solid consisting essentially of a basic zinc double salt of O,O-dialkyl phosphorodithioic acid of the formula

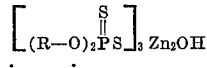

where R is a primary or secondary alkyl radical containing less than 19 carbon atoms, a thiazole containing the radical

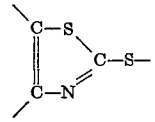

and a thiuram of the formula

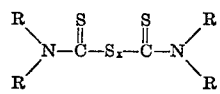

where the R's are alkyl or alicyclic radicals containing 1 to 9 carbon atoms, or the R's on the same nitrogen form a ring with the nitrogen which contain 4 to 9 carbon atoms, or the R's on the same nitrogen form a ring with the nitrogen of morpholine or 2,6-dimethylmorpholine, and $x$ is a number from 1 to 4; and heating the mixture at a vulcanizing temperature.

10. A method of vulcanizing a sulfur-vulcanizable rubber according to claim 9 wherein the basic zinc double salt is the basic zinc double salt of O,O-di-n-butyl phosphorodithioic acid, the thiazole is 2,2′-dithiobis(benzothiazole), and the thiuram is tetramethylthiuram monosulfide.

11. A method of vulcanizing a sulfur-vulcanizable rubber according to claim 9 wherein the rubber is EPDM.

12. A method of vulcanizing a sulfur-vulcanizable rubber which comprises:

mixing the rubber with a sulfur-containing vulcanizing agent and an accelerating amount of a vulcanization accelerator combination of a solid consisting essentially of a basic zinc double salt of O,O-dialkyl phosphorodithioic acid of the formula

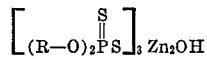

where R is a primary or secondary alkyl radical containing less than 19 carbon atoms and a thiuram of the formula

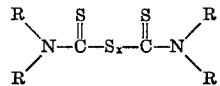

where the R's are alkyl or alicyclic radicals containing 1 to 9 carbon atoms, or the R's on the same nitrogen form a ring with the nitrogen which contains 4 to 9 carbon atoms, or the R's on the same nitrogen form a ring with the nitrogen of morpholine or 2,6-dimethylmorpholine, and $x$ is a number from 1 to 4; and heating the mixture at a vulcanizing temperature.

13. A method of vulcanizing a sulfur vulcanizable rubber according to claim 12 wherein the basic zinc double salt is the basic zinc double salt of O,O-di-n-butyl phosphorodithioic acid, and the thiuram is tetramethylthiuram monosulfide.

14. A method of vulcanizing a sulfur-vulcanizable rubber according to claim 12 wherein the rubber is EPDM.

References Cited

UNITED STATES PATENTS 2,974,780  6/1957  Wystrach et al. _____ 260—389
3,308,103  3/1967  Coran et al. _____ 260—79.5

JOSEPH L. SCHOFER, *Primary Examiner.*

D. K. DENENBERG, *Assistant Examiner.*